(12) United States Patent
Yang (10) Patent No.: US 10,971,125 B2
(45) Date of Patent: Apr. 6, 2021

(54) MUSIC SYNTHESIS METHOD, SYSTEM, TERMINAL AND COMPUTER-READABLE STORAGE MEDIUM

(71) Applicant: Baidu Online Network Technology (Beijing) Co., Ltd, Beijing (CN)

(72) Inventor: Jie Yang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 177 days.

(21) Appl. No.: 16/214,357

(22) Filed: Dec. 10, 2018

(65) Prior Publication Data

US 2019/0385578 A1    Dec. 19, 2019

(30) Foreign Application Priority Data

Jun. 15, 2018    (CN) .......................... 201810622079.X (51) Int. Cl.
*G10H 1/36*    (2006.01)
*G10L 15/04*    (2013.01)
(Continued)

(52) U.S. Cl.
CPC ............. *G10H 1/366* (2013.01); *G10L 15/04* (2013.01); *G10L 15/22* (2013.01);
(Continued)

(58) Field of Classification Search
CPC ............. G10H 1/366; G10H 2210/005; G10H 2210/066; G10H 7/02; G10H 2250/311; G10H 2210/061; G10H 2250/455; G10H 1/0008; G10H 1/32; G10H 2250/315; G10H 2250/541; G10H 2240/046; G10L 15/04;
(Continued)

(56) References Cited

U.S. PATENT DOCUMENTS 8,244,546 B2 *    8/2012   Nakano .................. G10H 1/366
                                                       704/500
9,489,938 B2 *   11/2016   Mizuguchi .......... G10L 13/0335
(Continued)

FOREIGN PATENT DOCUMENTS

CN           101901598 A       12/2010
CN           104391980 A        3/2015
(Continued)

OTHER PUBLICATIONS

First Office Action issued in connection with Chinese Application No. 201810622079.X, dated May 23, 2019.
(Continued)

*Primary Examiner* — Jeffrey Donels
(74) *Attorney, Agent, or Firm* — Akerman LLP (57) ABSTRACT

A music synthesis method, a system, a terminal and a computer-readable storage medium are provided. The method includes: receiving a track selected by a user; obtaining a text; receiving speech data recorded by the user on the basis of the text; and forming a music file in accordance with the selected track and the speech data. The speech of a user can be combined with the track through the music synthesis method of the present application and an optimal effect of music can be simulated such that the user can participate in the singing and presentation of a music, thereby making music more entertaining.

16 Claims, 10 Drawing Sheets

(51) Int. Cl.
*G10L 15/22* (2006.01)
*G10L 21/0232* (2013.01)

(52) U.S. Cl.
CPC .... *G10L 21/0232* (2013.01); *G10H 2210/005* (2013.01); *G10H 2210/066* (2013.01)

(58) Field of Classification Search
CPC ..... G10L 15/22; G10L 21/0232; G10L 21/01; G10L 21/013
USPC .......................................................... 84/634
See application file for complete search history.

(56) References Cited

U.S. PATENT DOCUMENTS

| | | | | |
|---|---|---|---|---|
| 10,325,581 | B2* | 6/2019 | Ogasawara | G10H 1/0066 |
| 10,431,193 | B2* | 10/2019 | Setoguchi | G10H 1/0016 |
| 10,497,347 | B2* | 12/2019 | Ogasawara | G10H 1/12 |
| 10,629,179 | B2* | 4/2020 | Danjyo | G10H 1/36 |
| 2004/0006472 | A1* | 1/2004 | Kemmochi | G10L 13/033 |
| | | | | 704/269 |
| 2009/0306987 | A1* | 12/2009 | Nakano | G10L 13/10 |
| | | | | 704/260 |
| 2011/0004476 | A1* | 1/2011 | Saino | G10H 1/0008 |
| | | | | 704/267 |
| 2011/0054902 | A1* | 3/2011 | Li | G10L 13/033 |
| | | | | 704/258 |
| 2013/0019738 | A1* | 1/2013 | Haupt | G10L 21/013 |
| | | | | 84/622 |
| 2013/0151256 | A1* | 6/2013 | Nakano | G10L 13/0335 |
| | | | | 704/268 |
| 2013/0339035 | A1* | 12/2013 | Chordia | G10L 19/02 |
| | | | | 704/500 |
| 2014/0006031 | A1* | 1/2014 | Mizuguchi | G10L 13/04 |
| | | | | 704/260 |
| 2014/0046667 | A1* | 2/2014 | Yeom | G10H 1/0025 |
| | | | | 704/258 |
| 2015/0025892 | A1* | 1/2015 | Lee | G10L 21/007 |
| | | | | 704/267 |
| 2019/0378531 | A1* | 12/2019 | Jensen | G10L 21/0232 |
| 2019/0385578 | A1* | 12/2019 | Yang | G10H 7/02 |
| 2020/0105244 | A1* | 4/2020 | Kuramitsu | G10L 13/043 |
| 2020/0105281 | A1* | 4/2020 | Chordia | G10L 19/00 |

FOREIGN PATENT DOCUMENTS

| | | |
|---|---|---|
| CN | 103440862 B | 3/2016 |
| CN | 107871492 A | 4/2018 |
| CN | 108053814 A | 5/2018 |
| JP | 2005004107 A | 1/2005 |
| JP | 2015125268 A | 7/2015 |
| JP | 2017181793 A | 10/2017 |

OTHER PUBLICATIONS

International Search Report issued in connection with Chinese Application No. 201810622079.X, dated May 15, 2019.

Notice of Reasons for Refusal issued in connection with Japanese Patent Application No. 2018-228669, dated Feb. 17, 2020.

Saitou, Takeshi et al., "Outside Trinominal, and SingBySpeaking: System Which Controls the Sound Characteristics Important for Singing Voice Consciousness, and Converts Speech Sound to Singing Voice," Information Processing Society of Japan Report of Research, Japan, Information Processing Society of Japan, Feb. 8, 2008, 2008th vol., 12th vol., pp. 25-32.

* cited by examiner

MUSIC SYNTHESIS METHOD, SYSTEM, TERMINAL AND COMPUTER-READABLE STORAGE MEDIUM

The present application claims the benefit of priority to Chinese patent application No. 201810622079.X, filed before the State Intellectual Property Office on Jun. 15, 2018, and entitled "Music Synthesis Method, System, Terminal And Computer-Readable Storage Medium", which is incorporated in the present application by reference in its entirety.

TECHNICAL FIELD

The present application relates to a field of communication technology, and in particular, to a music synthesis method, a system, a terminal and a computer-readable storage medium.

BACKGROUND

Music is one of important forms of entertainment for people. With the development of a mobile Internet, music may be presented in various forms. In addition to listen to music through a smart device such as a mobile phone, users can also participate in singing and recording of music through various applications.

However, it requires professional skills in singing. Generally, users are required to have a good tone and understand pitch and rhythm of a track. Hence, it will be difficult for a user who lacks music knowledge and has a bad sense of music to participate in singing.

Therefore, how to combine a user's voice with a track to simulate an optimal music effect is the most concern.

SUMMARY

A music synthesis method and device, a system, a terminal and a computer-readable storage medium are provided according to embodiments of the present application, so as to at least solve the above technical problems in the existing technology.

According to a first aspect, a music synthesis method, the method includes: receiving a track selected by a user; obtaining a text, receiving speech data recorded by the user on the basis of the text; and forming a music file in accordance with the selected track and the speech data.

In conjunction with the first aspect, in a first implementation of the first aspect of the present application, the obtaining a text includes: receiving a lyric text corresponding to the track, wherein the lyric text is selected by the user from a music library.

In conjunction with the first aspect, in a second implementation of the first aspect of the present application, the obtaining a text includes: receiving a user-generated text inputted by the user.

In conjunction with the first aspect, the first implementation of the first aspect and the second implementation of the first aspect, in a third implementation of the first aspect of the present application, before forming a music file in accordance with the selected track and the speech data, the method further includes: performing noise reduction to the speech data.

In conjunction with the first aspect, in a fourth implementation of the first aspect of the present application, the forming a music file in accordance with the text and the speech data includes: dividing the speech data into a plurality of speech segments according to an acoustic feature of each word in the text; and matching the plurality of speech segments to the track, and adjusting the plurality of speech segments to form the music file in accordance with a tune and a rhythm of the track.

In conjunction with the first aspect, in a fifth implementation of the first aspect of the present application, the dividing the speech data into a plurality of speech segments according to an acoustic feature of each word in the text includes: obtaining a pre-stored acoustic model corresponding to each word in the text; and, according to an order of words in the text, dividing the speech data into a plurality of speech segments corresponding to respective acoustic models of the respective words.

In conjunction with the first aspect, in a sixth implementation of the first aspect of the present application, the matching the plurality speech segments to the track, and adjusting the plurality of speech segments to form a music file in accordance with a tune and a rhythm of the track includes: labelling the track to form a plurality of music segments; matching each speech segment to a respective music segment according to a position of the speech segment; and adjusting the plurality of speech segments to form the music file in accordance with tunes and rhythms of the plurality of music segments.

In conjunction with the first aspect, in a seventh implementation of the first aspect of the present application, the labelling the track to form a plurality of music segments includes: labelling a tune, a pitch, a position and a duration of each word in the track to form a plurality of musical segments in accordance with speech data of from an original vocalist of the track.

According to a second aspect, a music synthesis system includes: a track selecting unit configured to receive a track selected by a user; a text obtaining unit configured to obtain a text; a speech recording unit configured to receive speech data recorded by the user on the basis of the text; and a music forming unit configured to form a music file in accordance with the selected track and the speech data.

In conjunction with the second aspect, in a first implementation of the second aspect of the present application, the text obtaining unit is further configured to receive a lyric text corresponding to the track, wherein the lyric text is selected by the user from a music library.

In conjunction with the second aspect, in a second implementation of the second aspect of the present application, the text obtaining unit is further configured to receive a user-generated text inputted by the user.

In conjunction with the second aspect, the first implementation of the second aspect and the second implementation of the second aspect, in a third implementation of the second aspect of the present application, the system further comprises: a speech noise reducing unit configured to perform noise reduction to the speech data.

In conjunction with the second aspect, in a fourth implementation of the second aspect of the present application, the music forming unit includes: a speech dividing unit configured to divide the speech data into a plurality of speech segments according to an acoustic feature of each word in the text; and a music synthesizing unit configured to match the plurality of speech segments to the track, and adjusting the plurality of speech segments to form the music file in accordance with a tune and a rhythm of the track.

In conjunction with the second aspect, in a fifth implementation of the second aspect of the present application, the speech dividing unit comprises: a model obtaining unit configured to obtain a pre-stored acoustic model corresponding to each word in the text; and a segment dividing unit configured to, according to an order of words in the text, divide the speech data into a plurality of speech segments corresponding to respective acoustic models of the respective words.

In conjunction with the second aspect, in a sixth implementation of the second aspect of the present application, the music synthesizing unit comprises: a segment forming unit configured to label the track to form a plurality of music segments; a position matching unit configured to match each speech segment to a respective music segment according to a position of the speech segment; and a segment adjusting unit configured to adjust the speech segment to form a music file in accordance with a melody and a rhythm of the music segment.

In conjunction with the second aspect, in a seventh implementation of the second aspect of the present application, the segment forming unit is further configured to label a tune, a pitch, a position and a duration of each word in the track to form a plurality of musical segments in accordance with speech data of from an original vocalist of the track.

According to a third aspect, a music synthesis terminal includes: one or more processors; and a storage device configured for storing one or more programs; and when the one or more programs are executed by the one or more processors, the one or more processors are caused to implement the method according to the first aspect.

According to a fourth aspect, a computer-readable storage medium is provided, according to an embodiment of the present application in which a computer program is stored, wherein the computer program, when executed by a processor, implements the method according to the first aspect.

One of the above technical solutions has the following advantages or beneficial effects: the speech of a user can be combined with the track through the music synthesis method of the present application and an optimal effect of music can be obtained such that the user can participate in singing and presentation, thereby making the music more entertaining.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION OF THE EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

A music synthesis method and system, and a terminal are described, as shown in FIG. 1 to FIG. 11.

Figure 1:
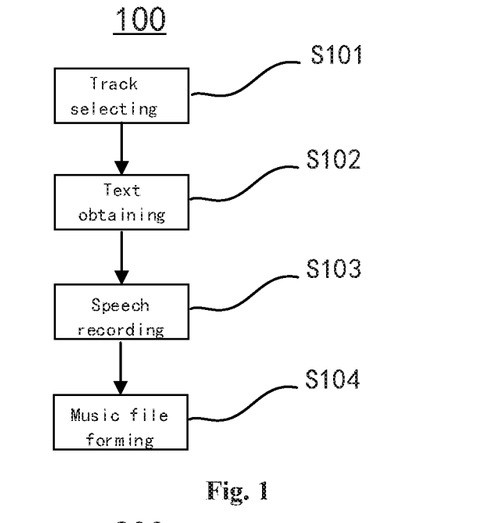
FIG. 1 is a flowchart of a music synthesis method 100 according to an embodiment of the present application.

As shown in FIG. 1, the music synthesis method 100 of the present application may include step S101 to step S104.

Firstly, in step S101, a track selected by a user may be received. The user may search and select his/her favorite track in a pre-stored music library. A music type of the track may include but is not limited to: Pop, rock, rap, folk and the like.

Then, in step S102, a text may be obtained. Preferably, a lyric text corresponding to the selected track may be selected by a user from a music library as the text in the step S102. Alternatively, a user-generated text inputted by the user may obtained as the text in the step S102.

Then, in step S103, speech data recorded by the user on the basis of the text may be received. The user may recite the selected lyric text or the user-generated text inputted by himself/herself as the speech data. In the step S103, the speech data recorded by the user can be received.

Also, in step S104, a music file may be formed in accordance with the selected track and the speech data received in the step S103.

A speech recorded by a user can be combined with a selected track to form a music file in accordance with a music synthesis method 100 of the present application, so that music presentation may become simple and an initiative of user to perform music can be enhanced.

Figure 2:
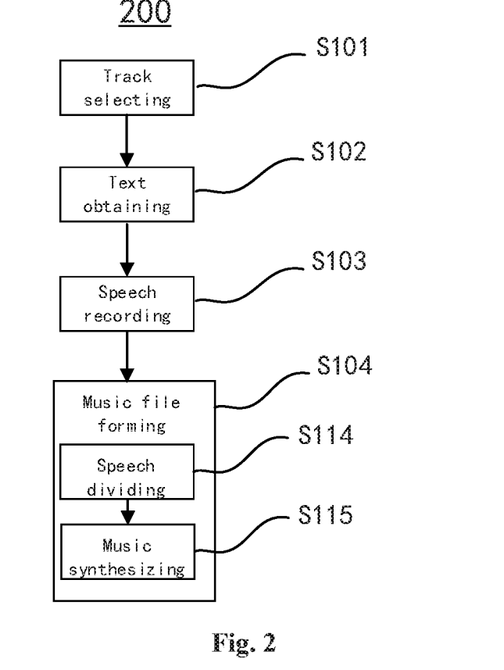
FIG. 2 is a flowchart of a music synthesis method 200 according to another embodiment of the present application.

As shown in FIG. 2, in the music synthesis method 200 of the present application, compared to the method 100, the step S104 can include step S114 and step S115.

In the step S114, the speech data can be divided into a plurality of speech segments in accordance with an acoustic feature of each word in the text. The acoustic feature includes at least one of a tune, a pitch, a position and a duration.

In an embodiment, particularly, an acoustic feature such as the tune, the pitch, the position and the duration of a word can be collected from huge amount of audio files and data Audio data of the obtained text can be predicted. Then, the acoustic feature such as the tune, the pitch, the position and the duration of each word in the audio data as predicted is in turn matched to the speech data successively, so that the speech data can be divided into at least one speech segment.

Finally, in the step S115, the plurality of speech segments may be matched to the track, and the plurality of speech segments may be adjusted to form a music file in accordance with a tune and a rhythm of the track.

In an embodiment, the plurality of speech segments can be matched to the selected track accordingly, and a position, a tune, a pitch and a duration and the like of each speech segment can be adjusted in accordance with a tune and a rhythm of the track. Thereby, the position, the tune, the pitch and the duration and the like of each speech segment can be matched to the tune and the rhythm of the track to form a music file.

In accordance with a music synthesis method 200 of the present application, a speech recorded by a user can be matched to a selected track, and the speech of the user can be adjusted according to the tune and a rhythm of the track, such that the speech of the user can be combined with the track. Through the method 200, not only can an optimal effect of music be simulated, but also can the user participate in singing and presentation of music, thereby making music more entertaining.

Figure 3:
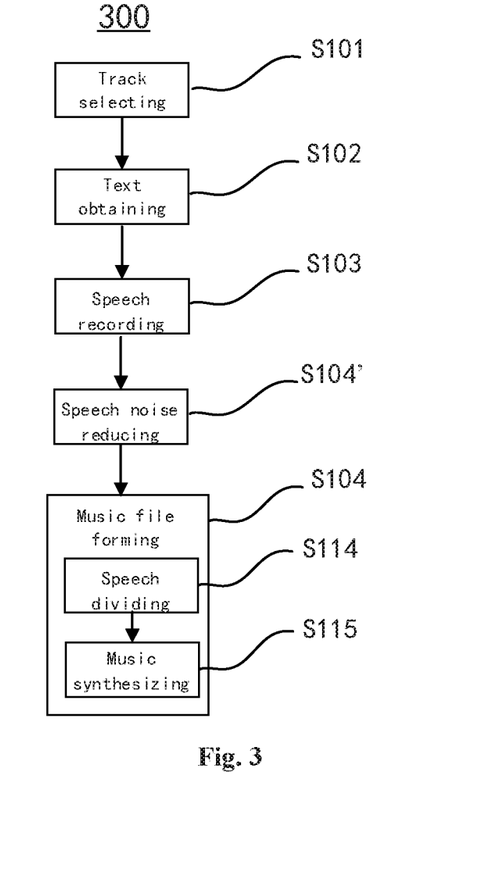
FIG. 3 is a flowchart of a music synthesis method 300 according to another embodiment of the present application.

As shown in FIG. 3, a music synthesis method 300 of an embodiment of the present application further includes step S104 before the step S104 compared to the method 100 or the method 200.

In the step S104', noise reduction may be performed to the speech data.

In an embodiment, noise reduction can be performed by suppressing the noise and performing a dereverberation to audio data, so that the effect of noise reduction for the audio data in a noisy environment can further be improved. Certainly, non-linear processing, for example, signal amplification, can also be used to improve the effect of noise reduction.

With the method 300 of the present application, a noise reduction can be performed to a speech data, so that noise disturbance in the speech data can be reduced and the quality of the speech data can be ensured.

Figure 4:
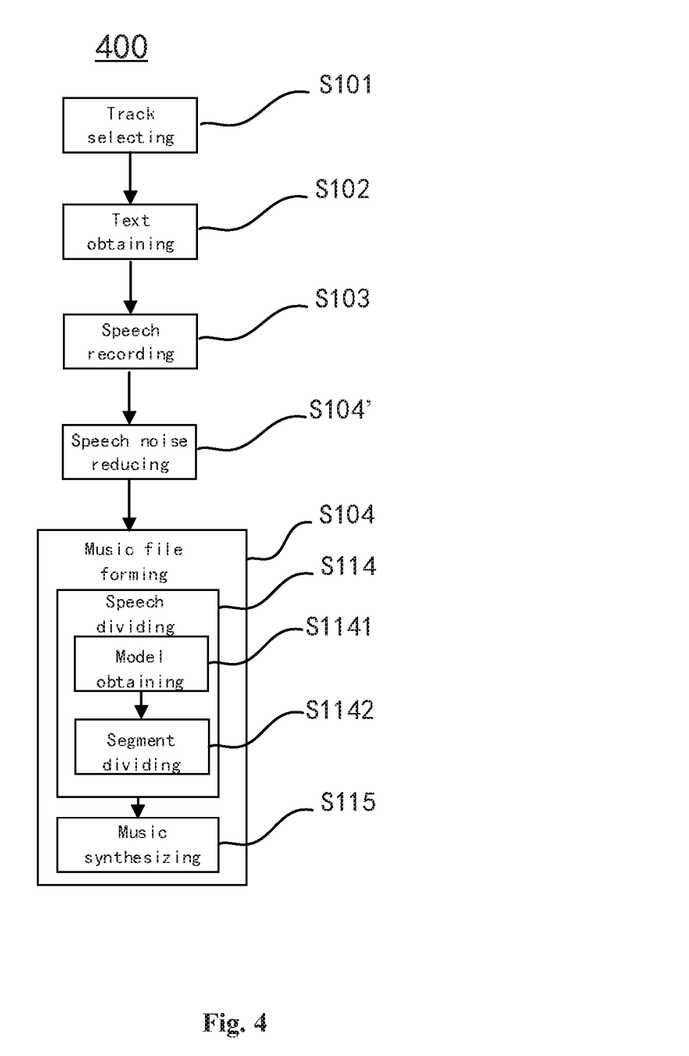
FIG. 4 is a flowchart of a music synthesis method 400 according to another embodiment of the present application.

As shown in FIG. 4, in a music synthesis method 400 of an embodiment of the present application, the step S114 includes further step S1141 and step S1142 compared to the method 300, the method 200 and the method 100.

In the step S1141, an acoustic model corresponding to each word in the text may be obtained. The acoustic model can be pre-stored in a program in which the music synthesis method is applied. Moreover, an acoustic model of a word can be obtained by collecting at least one pronunciation feature of this word in each of a huge number of audio files, and performing deep-learning and analysis through a neural network algorithm based on the collected pronunciation features. The pronunciation feature can include at least one of the tune, the volume, the pitch and the duration of the word in an audio file.

In one embodiment, taking "today" as an example, in the audio files "What are you going to do today", "Today, I want to swim", respective positions of "today" in respective audio files are different and respective pronunciation features, e.g. the tunes, the volumes, the pitches and the durations, of "today" in respective audio files are different. Then, statistic data of pronunciation features of "today" in the audio files can be obtained, and the acoustic model of "today" can be obtained through deep learning and analyzing.

Further, in an example in which "It snows today" is obtained as the text, an acoustic model corresponding to each word, i.e. "It", "snows", "today", can be found respectively in pre-stored acoustic models.

Then, in the step S1142, according to an order of words in the text, e.g. the order of "It", "snows", "today" in the above example, the speech data recorded by the user may be divided into a plurality of speech segments corresponding to respective acoustic models of the respective words.

With the method 400 of an embodiment of the present application, the speech data recorded by the user can be precisely divided into a plurality of speech segments, each of which includes one word, and the content regarding the text from the original speech data can be maintained without loss.

Figure 5:
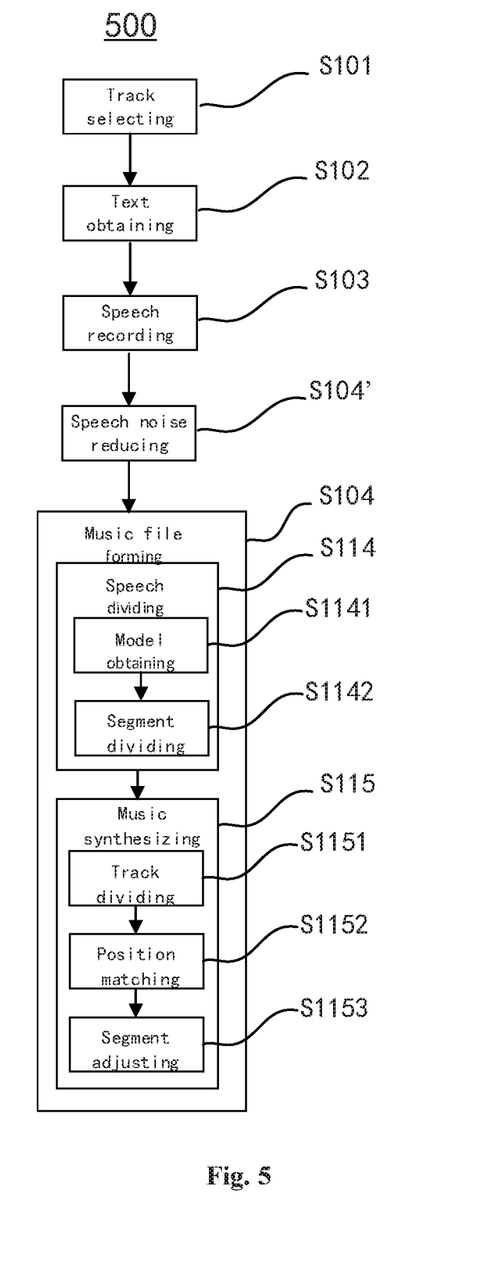
FIG. 5 is a flowchart of a music synthesis method 500 according to another embodiment of the present application.

As shown in FIG. 5, in a music synthesis method 500 of an embodiment of the present application, the step S115 further includes a step S1151, a step S1152 and a step S1153 compared to the method 400, the method 300, the method 200, and the method 100.

In the step S152, the track may be labelled to form a plurality of music segments.

In an embodiment, a tune, a pitch, a position and a duration of each word in the selected track can be labelled to form a plurality of music segments. Taking "Today is a good day" in the selected track "Good Day" as an example, a tune, a pitch, a position and a duration corresponding to each of "Today", "a", "good", "day", "good" in the track can be labelled so that respective music segments corresponding to "Today", "a", "good", "day", "good" can be formed. A plurality of music segments can also be arranged to form a music template. In this way, the music template can be directly applied to adjust the speech data of the user when the user selects the track.

Then in the step S1152, each of the plurality of speech segments obtained in the step S1142 may be matched to a respective music segment successively.

In the step S1153, a tune, a pitch, a position and a starting position of each speech segment can be adjusted in accordance with a tune and a rhythm of a respective music segment. Thereby, each speech segment can be adjusted to match with the tune and the rhythm of a respective music segment in order to form a music file.

In the method 500 of the present application, by simulating the singing of a user in accordance with the tune and the rhythm of a track, the user can participate in the singing and presentation of a track, thereby making music more entertaining.

Figure 6:
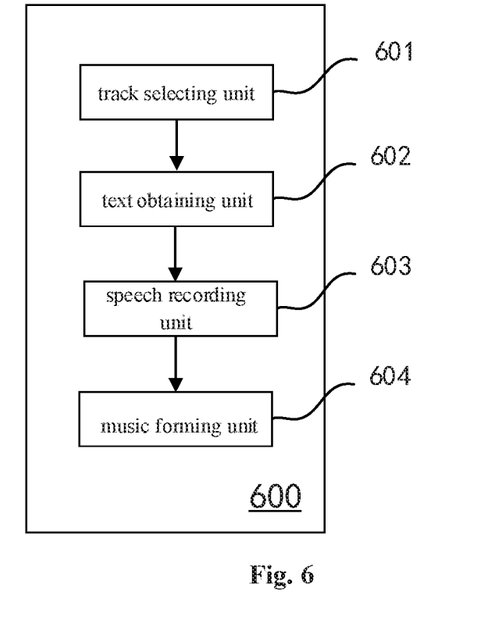
FIG. 6 is a schematic structural diagram of a music synthesis system 600 according to an embodiment of the present application.

As shown in FIG. 6, a music synthesis system 600 includes a track selecting unit 601, a text obtaining unit 602, a speech recording unit 603 and a music forming unit 604.

The track selecting unit 601 is configured to receive a track selected by a user.

The text obtaining unit 602 is configured to obtain a text. Preferably, a lyric text can be selected by a user from a music library corresponding to the selected track, and the lyric text as a text can be obtained in the text obtaining unit 602. Alternatively, a user-generated text can be inputted by a user and the user-generated text as a text can be obtained in the text obtaining unit 602.

The speech recording unit 603 is configured to receive speech data recorded by the user on the basis of the text. A user can recite a text and record it as the speech data in accordance with the selected lyric text or the user-generated text inputted by himself/herself. In the speech recording unit 603, the speech data recorded by the user can be received.

The music forming unit 604 is configured to form a music file in accordance with the selected track and the speech data.

Particularly, the music synthesis system 600 shown in FIG. 6 corresponds to the music synthesis method 100 shown in FIG. 1. The specific implementation of the system shown in FIG. 6 is described with reference to the embodiment of the method illustrated in FIG. 1.

Figure 7:
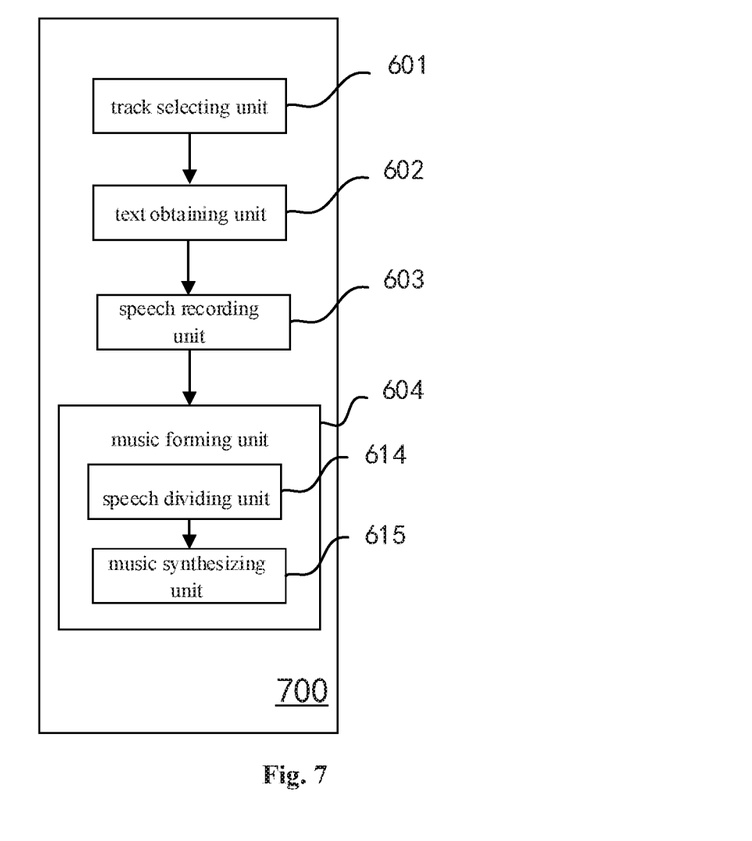
FIG. 7 is a schematic structural diagram of a music synthesis system 700 according to another embodiment of the present application.

As shown in FIG. 7, the music forming unit 604 further includes a speech dividing unit 614 and a music synthesizing unit 615 compared to the system 600.

In the speech dividing unit 614, the speech data can be divided into a plurality of speech segments according to an acoustic feature of each word in the text. The acoustic feature includes at least one of a tune, a pitch, a position and a duration.

In an embodiment, particularly, a feature corresponding to a tune, a pitch, a position and a sound duration and the like of each word can be collected from a huge number of audio files and data. Audio data can be predicted in accordance with the obtained text. Then, the audio data is in turn matched to the speech data in accordance with a feature of a tune, a pitch, a position and a duration and the like of each word, so that the speech data can be divided into a plurality of speech segments.

Finally, the plurality of speech segments can be matched to the track through the music synthesizing unit 615, and the plurality of speech segments can be adjusted to form a music file in accordance with a tune and a rhythm of the track.

In an embodiment, the plurality of speech segments can be matched to a selected track, and a position, a tune, a pitch and a duration and the like of each speech segment can be adjusted in accordance with a tune and a rhythm of the track. Thereby, a position, a tune, a pitch and a duration and the like of each speech segment can be matched to a tune and a rhythm of the track to form a music file.

In accordance with a music synthesis system 700 of the present application, a speech recorded by a user can be matched to a selected track, and the speech of a user can be adjusted through a tune and a rhythm of a track such that the speech of a user can be combined with the track. Through the system 700, not only can an optimal effect of music be simulated, but also can the user participate in the singing and presentation of a music, thereby making music more entertaining.

Particularly, the music synthesis system 700 shown in FIG. 7 corresponds to the music synthesis method 200 shown in FIG. 2. The specific implementation of the system shown in FIG. 7 is described with reference to the embodiment of the method illustrated in FIG. 2.

Figure 8:
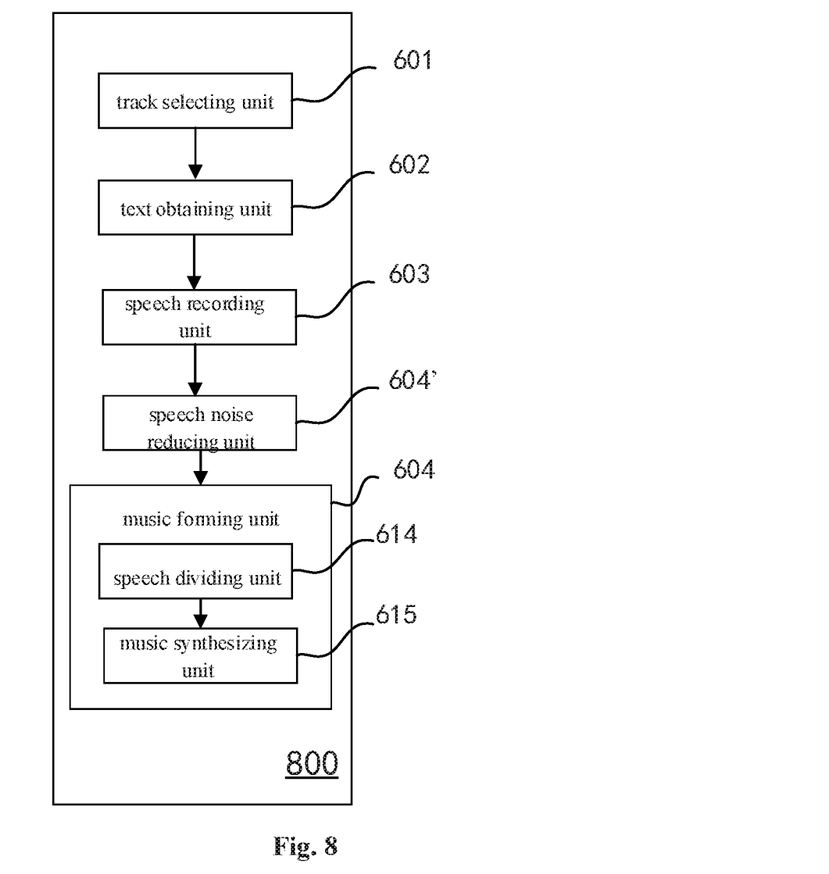
FIG. 8 is a schematic structural diagram of a music synthesis system 800 according to another embodiment of the present application.

As shown in FIG. 8, a music synthesis system 800 further include a speech noise reducing unit 604 based on the system 700 or the system 600.

The speech noise reducing unit 604' is configured to perform a noise reduction to a speech data.

Particularly, the music synthesis system 800 shown in FIG. 8 corresponds to the music synthesis method 800 shown in FIG. 3. The specific implementation of the system shown in FIG. 8 is described with reference to the embodiment of the method illustrated in FIG. 3.

Figure 9:
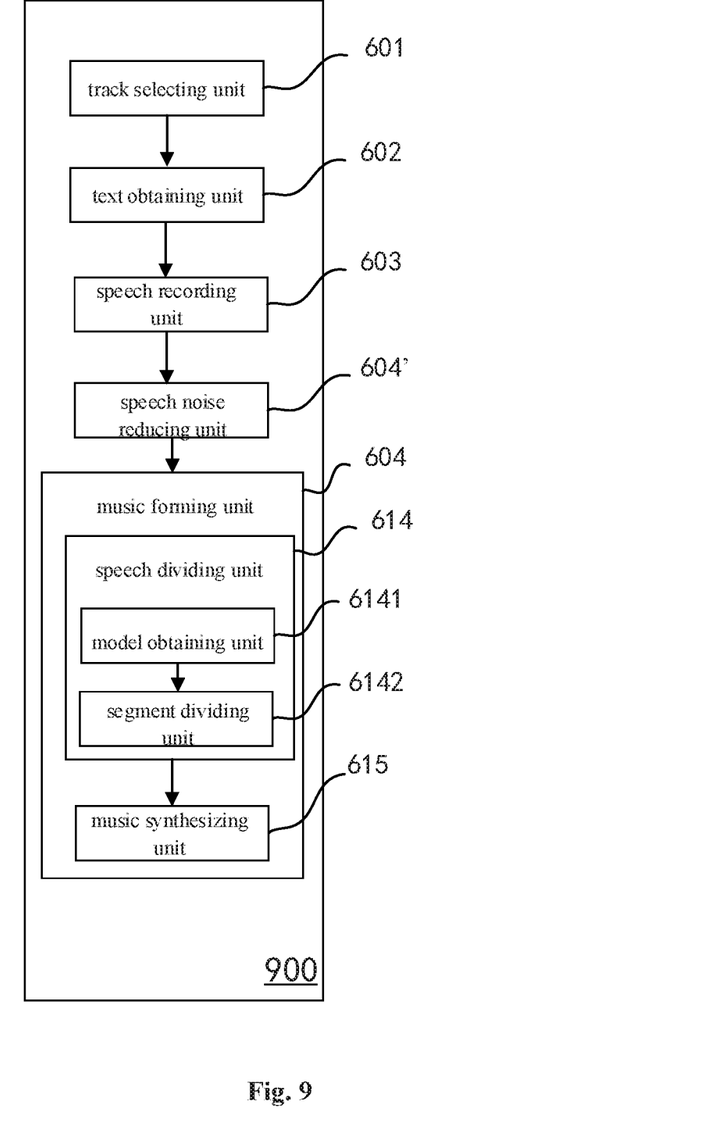
FIG. 9 is a schematic structural diagram of a music synthesis system 900 according to another embodiment of the present application.

As shown in FIG. 9, in a music synthesis system 900, a speech dividing unit 614 includes further a model obtaining unit 6141 and a segment dividing unit 6142.

The model obtaining unit 6141 configured to obtain a pre-stored acoustic model corresponding to each word in the text.

The segment dividing unit 6142 configured to, according to an order of words in the text, divide the speech data into a plurality of speech segments corresponding to respective acoustic models of the respective words.

The acoustic model can be pre-stored in a program in which the music synthesis method is applied. Also, an acoustic model of a word can be obtained by collecting at least one pronunciation feature of this word in each of a huge number of audio files, and performing deep-learning and analysis based on the collected pronunciation features. The pronunciation feature can include at least a tune, a volume, a pitch and a duration.

Particularly, the music synthesis system 900 shown in FIG. 9 corresponds to the music synthesis method 900 shown in FIG. 4. The specific implementation of the system shown in FIG. 9 is described with reference to the embodiment of the method illustrated in FIG. 4.

Figure 10:
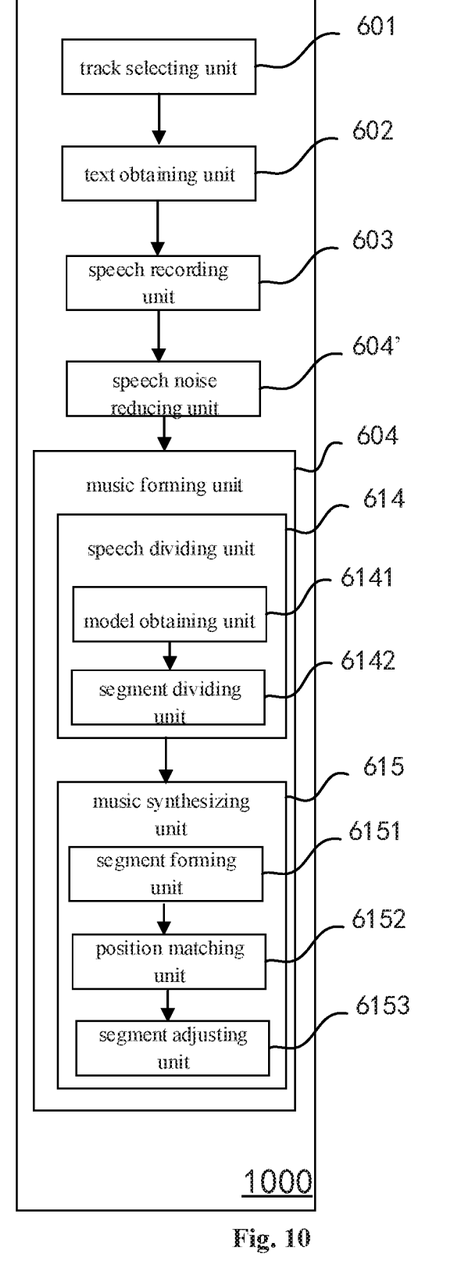
FIG. 10 is a schematic structural diagram of a music synthesis system 1000 according to another embodiment of the present application.

As shown in FIG. 10, in a music synthesis system 1000, the music synthesis unit 615 further includes a segment forming unit 6151, a position matching unit 6152 and a segment adjusting unit 6153 compared to the system 900 or the system 800 or the system 700 or the system 600.

The segment forming unit 6151 is configured to label the track to form a plurality of music segments. The segment forming unit 6151 can further label the tune, the pitch, the position and the duration of each word in the track to form a plurality of music segments in accordance with speech data of from an original vocalist of the track.

The position matching unit 6152 is configured to match each speech segment to a respective music segment according to a position of the speech segment; and The segment adjusting unit 6153 is configured to adjust the plurality of speech segments to form the music file in accordance with tunes and rhythms of the plurality of music segments.

Particularly, the music synthesis system 1000 shown in FIG. 10 corresponds to the music synthesis method 1000 shown in FIG. 5. The specific implementation of the system shown in FIG. 10 is described with reference to the embodiment of the method illustrated in FIG. 5.

Figure 11:
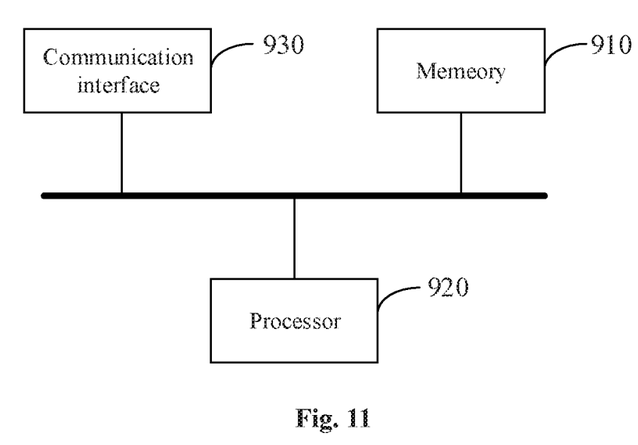
FIG. 11 is a schematic diagram of a music synthesis terminal according to the present application.

As shown in FIG. 11, the music synthesis terminal includes a memory 910 and a processor 920. The memory 910 stores a computer program executable on the processor 920. When the processor 920 executes the computer program, the information exchanging method in the foregoing embodiment is implemented. The number of the memory 910 and the processor 920 may be one or more.

The server further includes: a communication interface 930 configured to communicate with external devices and exchange data; and a memory 910 which may include a high-speed RAM memory and may also include a non-volatile memory, such as at least one magnetic disk memory.

If the memory 910, the processor 920, and the communication interface 930 are implemented independently, the memory 910, the processor 920, and the communication interface 930 may be connected to each other through a bus and communicate with each other. The bus may be an ISA (Industry Standard Architecture) bus, a PCI (Peripheral Component) bus, an EISA (Extended Industry Standard Component) bus, or the like. The bus may be divided into an address bus, a data bus, a control bus, and the like. For ease of illustration, only one bold line is shown in FIG. 11, but it does not mean that there is only one bus or one type of bus.

Optionally, in a specific implementation, if the memory 910, the processor 920, and the communication interface 930 are integrated on one chip, the memory 910, the processor 920, and the communication interface 930 may implement mutual communication through an internal interface.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A music synthesis method, comprising:
   receiving a track selected by a user;
   obtaining a text;
   receiving speech data recorded by the user on the basis of the text; and
   forming a music file in accordance with the selected track and the speech data,
   wherein the forming a music file in accordance with the text and the speech data comprises:
   dividing the speech data into a plurality of speech segments according to an acoustic feature of each word in the text; and
   matching the plurality of speech segments to the track, and adjusting the plurality of speech segments to form the music file in accordance with a tune and a rhythm of the track.

2. The music synthesis method according to claim 1, wherein the obtaining a text comprises:
   receiving a lyric text corresponding to the track, wherein the lyric text is selected by the user from a music library.

3. The music synthesis method according to claim 1, wherein the obtaining a text comprises:
   receiving a user-generated text inputted by the user.

4. The music synthesis method according to claim 1, wherein before forming a music file in accordance with the selected track and the speech data, the method further comprises:
performing noise reduction to the speech data.

5. The music synthesis method according to claim 1, wherein the dividing the speech data into a plurality of speech segments according to an acoustic feature of each word in the text comprises:
obtaining a pre-stored acoustic model corresponding to each word in the text; and
according to an order of words in the text, dividing the speech data into a plurality of speech segments corresponding to respective acoustic models of the respective words.

6. The music synthesis method according to claim 1, wherein the matching the plurality speech segments to the track, and adjusting the plurality of speech segments to form a music file in accordance with a tune and a rhythm of the track comprises:
labelling the track to form a plurality of music segments;
matching each speech segment to a respective music segment according to a position of the speech segment; and
adjusting the plurality of speech segments to form the music file in accordance with tunes and rhythms of the plurality of music segments.

7. The music synthesis method according to claim 6, wherein the labelling the track to form a plurality of music segments comprises:
labelling a tune, a pitch, a position and a duration of each word in the track to form a plurality of musical segments in accordance with speech data of from an original vocalist of the track.

8. A music synthesis system, comprising:
a track selecting unit configured to receive a track selected by a user;
a text obtaining unit configured to obtain a text;
a speech recording unit configured to receive speech data recorded by the user on the basis of the text; and
a music forming unit configured to form a music file in accordance with the selected track and the speech data,
wherein the music forming unit comprises:
a speech dividing unit configured to divide the speech data into a plurality of speech segments according to an acoustic feature of each word in the text; and
a music synthesizing unit configured to match the plurality of speech segments to the track, and adjusting the plurality of speech segments to form the music file in accordance with a tune and a rhythm of the track.

9. The music synthesis system according to claim 8, wherein the text obtaining unit is further configured to receive a lyric text corresponding to the track, wherein the lyric text is selected by the user from a music library.

10. The music synthesis system according to claim 8, wherein the text obtaining unit is further configured to receive a user-generated text inputted by the user.

11. The music synthesis system according to claim 8, wherein the system further comprises:
a speech noise reducing unit configured to perform noise reduction to the speech data.

12. The music synthesis system according to claim 8, wherein the speech dividing unit comprises:
a model obtaining unit configured to obtain a pre-stored acoustic model corresponding to each word in the text; and
a segment dividing unit configured to, according to an order of words in the text, divide the speech data into a plurality of speech segments corresponding to respective acoustic models of the respective words.

13. The music synthesis system according to claim 8, wherein the music synthesizing unit comprises:
a segment forming unit configured to label the track to form a plurality of music segments;
a position matching unit configured to match each speech segment to a respective music segment according to a position of the speech segment; and
a segment adjusting unit configured to adjust the plurality of speech segments to form the music file in accordance with tunes and rhythms of the plurality of music segments.

14. The music synthesis system according to claim 13, wherein the segment forming unit is further configured to label a tune, a pitch, a position and a duration of each word in the track to form a plurality of music segments in accordance with speech data of from an original vocalist of the track.

15. A music synthesis terminal, the terminal comprising:
one or more processors; and
a storage device configured for storing one or more programs; and
when the one or more programs are executed by the one or more processors, the one or more processors are caused to implement the method of claim 1.

16. A non-transitory computer-readable storage medium, in which a computer program is stored, wherein the computer program, when executed by a processor, implements the method of claim 1.

* * * * *